United States Patent [19]

Hübner et al.

[11] 4,340,525

[45] Jul. 20, 1982

[54] ADDITIVE FOR DEEP-WELL CEMENT SLURRIES

[75] Inventors: Wolfgang Hübner, Kempen; Otto Schroers; Hans J. Sladeck, both of Krefeld, all of Fed. Rep. of Germany

[73] Assignee: Chemische Fabrik Stockhausen & Cie, Krefeld, Fed. Rep. of Germany

[21] Appl. No.: 245,475

[22] Filed: Mar. 19, 1981

Related U.S. Application Data

[63] Continuation of Ser. No. 56,490, Jul. 11, 1979, abandoned.

[30] Foreign Application Priority Data

Jul. 12, 1978 [DE] Fed. Rep. of Germany ....... 2830528

[51] Int. Cl.$^3$ ............................................... C04B 7/35
[52] U.S. Cl. .............................. 252/8.55 B; 106/314; 106/315; 106/90; 166/293; 524/5
[58] Field of Search ......................... 106/90, 314, 315; 166/293, 294; 260/29.6 S, 29.6 PS, 42.13

[56] References Cited

U.S. PATENT DOCUMENTS

2,775,557 12/1956 Morgan ................................. 252/8.5
2,868,753 1/1959 Morgan et al. ................... 260/42.13
3,937,633 2/1976 Knight et al. ................... 260/29.6 S

*Primary Examiner*—James Poer
*Attorney, Agent, or Firm*—Sprung, Horn, Kramer & Woods

[57] ABSTRACT

An additive for deep-well cement slurries comprising a water-soluble anionic copolymer having a molecular weight from about 50,000 to 500,000 and comprising about 1 to 60 mole % of anionic structural units and about 99 to 40 mole % of nonanionic structural units. A preferred additive comprises a terpolymer of acrylamide, sodium acrylate and sodium vinylsulphonate. The additives retard the setting action of the slurry, stabilize the slurry, prevent the swelling of readily hydratable clays and are resistant to electrolytes which would accelerate setting and seepage of water from the slurry.

13 Claims, No Drawings

ADDITIVE FOR DEEP-WELL CEMENT SLURRIES

This is a continuation of application Ser. No. 056,490, filed July 11, 1979, now abandoned.

ADDITIVE FOR DEEP-WELL CEMENT SLURRIES

The invention relates to an additive for deep-well cement slurries and the use of this additive in deep-well cement slurries for the cementation of deep wells. Such cementation is carried out using cement slurries that are produced using water and special deep-well cements. Such a cement slurry must have a number of properties in view of the conditions found in a deep well (elevated temperature and increased pressure, electrolyte influence, and influences of the geological formation). The most important of these properties are:

1. A retarded setting action so that the slurry does not set permatively under the increased pressures and temperatures prevailing in deep walls on its way to the actual cementation area, which would lead to the well becoming blocked and would render complicated cementation operations impossible. By retarding setting, the cement slurry is thus kept flowable for longer.

2. A water-retaining capacity for the water present in the cement slurry, so that the cement dispersion remains stable until setting is complete and the geological formation in the well and the cementation process are not adversely affected by water loss from the slurry.

3. Prevention of readily hydratable clays from swelling, so that the unregulated uptake of dispersed clay into the cementation slurry during the pumping operation, which would lead to the strength of the set cement being impaired, is suppressed.

4. Resistance to electrolyte, that is to say, resistance to the action of saline water in order to prevent the acceleration of setting caused by the electrolytes even at elevated temperatures and especially to prevent the seepage of water from the cement slurry.

It is already well known to adjust or control the desired properties of cement slurries by means of additives, according to the deep-well conditions (e.g. depth of the well, type of geological formation). Thus, it is already well known to achieve the necessary retardation of the setting process using additives wherein, in practice, in addition to inorganic salts such as NaCl and $CaCl_2$, lignosulphonates, polyhydroxy acids, hydroxyethylcellulose, carboxymethylhydroxyethylcellulose and surfactants have proved successful. Products based on Na-carboxymethylcellulose, hydroxyethylcellulose and carboxymethylhydroxyethylcellulose also simultaneously reduce the outflow of water from the cement slurry. The effectiveness of these semi-synthetic products is, however, limited as a result of their thermal decomposition at 160° to 170° C. Such temperatures are easily exceeded in deep wells however, where, even at well depths of 4000 to 5000 meters, temperatures of 150° to 200° C. are found. Apart from this, during the thermal decomposition process, in some cases an undesirable acceleration of the setting of the cement slurry is also observed. In addition, products based on carboxymethylcellulose have a high sensitivity to divalent metal ions.

It is also already well known that the water-retaining action of the cement slurry can be improved by additives. Such additives are known to the expert as "fluid-loss additives". In this manner, a limited reduction in the filtrate value can be achieved with Na-carboxymethyl-cellulose. Good results are obtained with carboxymethylhydroxyethylcellulose and hydroxyethylcellulose which, in addition, also have a retarding effect on the setting process; however, the effectiveness of these products is limited by their sensitivity to temperature and their sensitivity to divalent metal ions.

The description of the general industrial state of the additives for deep-well cementation reveals that the currently used products are inadequate in their effectiveness under the difficult conditions encountered today.

This situation and the properties of the known products can be found in the following list of references:

1. K. H. Grodde, "Bohrspülung and Zementschlämme in der Tiefbohrtechnik" ("Bore fluid and cement slurries in deep-well technology"), Hamburg, 1963, pp. 135 ff.
2. F. Keil, "Zement" ("Cement") 1971, pp. 28–31.
3. G. Büttner, "Einsatz von Tensiden, tensidhaltigen Nährstoffen und Polymeren bei der Zementation" ("Use of surfactants, surfactant-containing nutrients and polymers in cementation"), in K. Lindner, "Tenside-Textilhilfmittel-Waschrohstoffe" ("Surfactants—Textile auxiliaries—Detergents"), 1974.
4. P. N. Parker and C. Clement, "Basic cementing—3, Additives tailor cement to individual wells" in *The Oil and Gas Journal*, Mar. 14, 1977, pp. 54–58.
5. D. K. Smith, "Cementing" S. P. E.—Monography Vol. 4, 1976, New York.

It is therefore the aim of the invention so to improve the properties of a cement slurry for the cementation of deep wells that the cement slurry satisfies in an optimum manner all requirements made of it by the special deep-well conditions. In other words, the aim of the invention is to provide an additive which, in the completest way possible, imparts to the cement slurry those properties that are required of it by the special deep-well conditions.

This problem is solved according to the invention in that there are added to the cement slurry certain synthetic, water-soluble, polymeric products, as a result of which the cementation of deep wells can be carried out in a more efficient manner than hitherto. The synthetic, water-soluble, polymeric additives are water-soluble polymerizates that, in aqueous solution, have the character of anionic polyelectrolytes and that are characterized in that they have comparatively low molecular weights and have a specific composition with regard to the proportion of the inorganic, anionically active groups or blocks in comparison with the non-ionogenic groups or blocks.

The subject of the invention is, therefore, an additive for deep-well cement slurries, which is characterized in that it comprises water-soluble polymers, especially copolymers, that have a molecular weight of approximately 50,000 to 500,000 and that comprises approximately 1 to 60 mole % of anionic structural units and approximately 99 to 40 mole % of non-ionic structural units.

The water-soluble anionic polymerizates used according to the invention preferably have a molecular weight within the range from approximately 60,000 to 250,000, a range from approximately 70,000 to 150,000 being especially preferred. An additive according to the invention having an optimum retarding effect on the setting and having a fluid-loss action has a molecular weight of approximately 120 000 (all molecular weights are based on the mean viscosity).

In addition to the molecular weight, the ratio of ionogenic (anionic) portions to the non-ionogenic portions in the polymer molecule is important. It has been shown that, for an adequate fluid-loss action, anionic portions as low as approximately 1 mole % are sufficient so that, in principle, polymerizates having from 1 to 60 mole % of anionic portions, and accordingly approximately 99 to 40 mole % of non-ionic portions are suitable. Polymerizates according to the invention preferably have approximately 10 to 50 mole % of anionically active groups, especially approximately 20 to 40 mole %. An especially effective additive according to the invention is based on a polymerizate that contains 30 mole % of anionically active groups.

The anionically active constituents of the polymerizates are preferably derived from the salts of acrylic and/or methacrylic acid, the alkali metal salts being preferred, but the alkaline earth metal salts of acrylic acid or methacrylic acid also being suitable. Among the alkali metal salts, especially the sodium and potassium salts may be mentioned, as well as ammonium salts.

Especially preferred are copolymers of acrylamide or methacrylamide as the non-ionic component, and acrylates or methacrylates as the anionic component. Moreover, polymers that contain, as the non-ionic component, a mixture of acrylamide and methacrylamide and, as the anionic component, a mixture of acrylates and methacrylates are also suitable.

Moreover, in addition to acrylamide and/or methacrylamide and acrylates and/or methacrylates, the polymerizates may contain further water-soluble monomers and, in small amounts, also monomers that are not readily water-soluble. The admissible amounts are limited, first, by the requirement that the polymerizate must remain, as a whole, water-soluble and, secondy, because, with the additional use of water-soluble anionactive monomers, the limits given above for the anionic portion in the total molecule must not be exceeded or gone below. The amounts of monomers that may be present in addition to acrylamide and acrylate, or methacrylamide and methacrylate, as third monomers, should not exceed about 10 mole % based on the total monomers.

Water-soluble monomers that may be additionally copolymerized in these small amounts are, for example, vinylsulphonic acid, vinylpyrrolidone, esters of amino alcohols and acrylic acid, esters of amino alcohols and methacrylic acid, and acrylic acid amidosulphonic acid. Monomers that are not readily water-soluble that may be mentioned are acrylic acid esters and methacrylic acid esters, and also acrylonitrile. A terpolymer of acrylamide and sodium acrylate with a small amount of sodium vinylsulphonate has proved especially advantageous.

These polymerizates also have a non-coagulating or flocculating action on relatively highly concentrated solid-containing dispersions. known polymerization methods, for example by radical polymerization of the monomers in aqueous solution (or dispersed as a water-in-oil emulsion). In aqueous solution, the products possess the characteristic features of anionic polyelectrolytes.

The polymerizates are obtained and used as pulverulent products, but they may also be used as an aqueous solution of about 1 to 40% strength, preferably as a concentrated aqueous solution of about 20 to 35% strength. Especially in current offshore technology, there is a requirement for liquid additives. The polymerizates are normally added to the water prior to the deep-well cement being added in the customary manner, that is to say, added and mixed using the known mixing apparatus. Alternatively, addition to the concentrated cement dispersion is possible. The amount of active substance that is added to the cement slurry is naturally dependent on the given well conditions and on the type of cement, but generally ranges from about 0.1 to 2.0% by weight, preferably about 0.5 to 1.5% by weight, based on the weight of the cement.

The additives according to the invention are active in cement slurries that are prepared with graded API-cements and moreover, other types of cement, for example Blue Circle cement, for the cementation of wells. The optimum proportion of ingredients, especially the amounts of the novel additives to be added, may be ascertained by preliminary experiments.

The additives according to the invention have the following advantageous properties:

(1) As additives, they have a very strong influence on the setting process of the cement slurry in that they have a strong retarding action. Compared with previously known products, even with an addition of at most 1.5% of active substance of the products according to the invention, above-average setting times of up to 7 hours are achieved. The products are therefore excellently suitable as setting retarders for cementation slurries for the cementation of deep wells and, under the conditions in a deep well, permit complicated cementation operations to be carried out, because the cementation slurries are kept in a flowable state for longer after the addition of the said products.

(2) The products according to the invention at the same time considerably increase the water-retaining action of the cement slurry so that the condition of the cement slurry remains unchanged and the geological formation in the well and the cementation operation are not damaged or adversely affected by filtration processes. The products mentioned are thus excellently suited to impart to the deep-well cement the properties of a LWL-cement (low-water-loss cement) with the advantage of a slight filtrate loss and, optionally, to prevent blocking of the hydrocarbon-carrier rock as a result of water blocking.

(3) As the cement slurries are being prepared in the manner described, the products mentioned improve the condition of the cement/water dispersion by stabilizing the dispersion and favorably influencing the rheological properties of the cement slurries by liquefying the dispersion, which has a very positive effect on the operation of the deep-well cementation. They differ substantially in this respect from a number of previously known additives, which normally show a tendency to increase the viscosity or the flow-resistance of the cement slurry during the pumping operation, which is undesirable for several reasons (pumping efficiency, washing effect).

(4) Furthermore, as additives, the products according to the invention cause the cement slurry for the deep well to have a protective effect on the formation of the deep well during the pumping and cementation operation, as a result of the fact that they inhibit the swelling of readily hydratable clays and thus at the same time suppress the unregulated uptake of dispersed clay into the cementation slurry during the pumping operation, which would lead to impairment of the strength of the set cement; and in an economically efficient manner, keep the required amounts of cementation slurries to a low level while the well wall is stabilized.

(5) Compared with other previously used cementation additives, a further important feature of the additives according to the invention is that they retain their effectiveness even at relatively high temperatures.

(6) The effectiveness of the additives according to the invention in cement/water dispersion has likewise been demonstrated in the use, on a small scale, of saline water, (e.g. in sea water), where, even at elevated temperatures, for example at 60° C., they prevent the acceleration of setting otherwise observed and caused by the low electrolyte content, and, in particular, furthermore prevent seepage of water from the cement slurry. For the mixing of the cement slurry when using the additives according to the invention, both fresh water and electrolyte-containing water, for example, sea water, may therefore be used, because the additives retain their effectiveness even in such dilute salt solutions.

The recognition that anionically active polymerizates of a specific molecular weight and with a specific ratio of anionic to non-anionic portions are such an excellent additive for deep-well cement slurries is not anticipated by the state of the art and is therefore to be regarded as unexpected. Admittedly, it is already well known to use aqueous solutions of hydrolyzed polyacrylamides, that is to say, polymerizates containing anionic groups, as a fluid-loss additive in clay suspensions, as used in bore fluids; however, owing to the differing structure of clay, which is a swellable stratified silicate, and cement, which has no stratification lattice and is therefore not capable of swelling, it was not to be expected that the additives according to the invention would also be effective as a fluid-loss additive in deep-well cements. This was even more unexpected since the requirements made of a bore fluid are, in some cases, completely different from the requirements made of a cement slurry for deep wells. Whereas, in the case of the bore fluid, the obtaining of a specific viscosity is desirable, that is to say, for example, an increase in the viscosity of the bore fluid for the purpose of increasing its carrying capacity for the drillings, in the case of a cement slurry for deep wells it is the converse that is important, namely, that the viscosity should be as low as possible, so that pumping or conveying of the slurry is made as easy as possible. The bore fluid and cement slurry also differ fundamentally in their rheological behavior: whereas, in the case of the bore fluid, the characteristics of a thixotropic gel are desired, so that the drillings suspended in the bore fluid do not precipitate out of the stagnant bore fluid, the behavior of a thixotropic gel in the case of a cement slurry is highly undesirable, since, when the pumping operation is interrupted, which amounts to a cessation of the action of shearing forces on the slurry, the slurry must remain fluid and must in no way solidify like a thixotropic gel. The fact that the suitability of a product as a fluid-loss additive for bore fluids does not suggest its suitability as a fluid-loss additive for cement slurries for deep wells, let alone its suitability as an additive that not only prevents water loss from the cement dispersion but moreover primarily has a setting-retarding action and a series of further advantageous effects, is also borne out in practice. Thus, for example, a product based on an anionic polymerizate, having 30 mole % anionic portions and a molecular weight of approximately 430 000 that acts as a good fluid-loss additive in clay suspensions is not suitable as a corresponding additive for a cement slurry for deep wells, because in this case an adequate water-retaining action can not be observed. A well-known commercially available fluid-loss additive for bore fluids that has a molecular weight of the anionic polymer based on acrylate of approximately 250,000 and an anionic portion of approximately 60 mole % also does not exhibit any fluid-loss action on a cement dispersion. The inventive teaching however, must also be regarded as surprising for the reason that it is expressly stated in the state of the art that polyacrylates, that is to say, anionic polymerizates, as also used according to the invention do not cause any pronounced setting retardation, but exhibit such an action only in conjunction with sodium chromate, wherein the use of chromium salts is to be regarded critically from a biological point of view (compare Lindner, "Tenside-Textilhilfsmittel-Waschrohstoffe" ("Surfactants—Textile auxiliaries—Detergents"), 1974, page 3017).

The invention is explained by the following examples but is not limited thereby.

The polymerizates used as additives for the cement slurry are prepared by radical polymerization in aqueous solution.

EXAMPLE 1

159 g of acrylamide and 69.1 g of acrylic acid are dissolved in 575 g of water, and 82.5 g of 45% strength sodium hydroxide are added thereto. The solution is adjusted to pH 6.0 and 3.75 g of potassium peroxydisulphate, 28.5 g of a 20% strength sodium pyrosulphite solution and 0.5 g of a 3% strength iron(II) ammonium sulphate solution are added.

An aqueous solution of a polymerizate is formed having a limiting viscosity of 91.8 ml/g. The 27.1% strength polymerizate solution has a viscosity of 5400 mPa.s (according to Brookfield).

EXAMPLE 2

The solution obtained from 133 g of acrylamide, 99.8 g of acrylic acid, 67.4 g of 24% strength ammonia and 667.8 g of water is adjusted to pH 6.0 and polymerized with 2.66 g of potassium peroxydisulphate and 28.5 g of sodium pyrosulphite as a 20% strength solution and with 0.1 g of iron ammonium sulphate in 10% strength solution.

The polymerizate is present as a 25% strength aqueous solution having a viscosity of 900 mPa.s (according to Brookfield). The limiting viscosity is 95.5 ml/g.

According to the reaction procedures of Examples 1 and 2, additional polymerizates effective as additives in cement slurries are obtained in known manner using the monomers specified.

EXAMPLE 3

A polymerizate is prepared, according to the reaction procedure of Example 1, from 159.0 parts of acrylamide, 69.1 parts of acrylic acid and 33.3 parts of sodium vinyl sulphonate.

EXAMPLE 4 (COMPARISON EXAMPLE)

A product of identical composition is prepared according to the procedure of Example 1, but with a substantially higher degree of polymerization. The 27.1% strength solution has a viscosity of 248,000 mPa.s (according to Brookfield) at 20° C.

EXAMPLE 5 (COMPARISON EXAMPLE)

A polymerizate is prepared, according to the procedure of Example 1, from 68.2 g of methacrylamide, 161.3 g of acrylic acid and 192.1 g of 45% strength sodium hydroxide in 464.9 g of water, and contains approximately 70 mole % of anionic groups and, in 28.4% solution, has a viscosity of 8900 mPa.s (according to Brookfield at 20° C.).

The mode of action of these polymerizates as additives in cement slurries becomes apparent from the following examples with reference to the properties of cement slurries without and after addition of the polymerizates mentioned. The cement slurry is prepared under identical conditions in each case in accordance with the procedure of Example 6 (see also F. Keil, "Zement" ("Cement") 1971, page 149).

EXAMPLE 6

14.3 g each of the aqueous polymerizates according to Examples 1 to 5 are dissolved, while stirring at 500 rev/min, in 165.7 g of water that had previously had added to it 5.2 g of NaCl (technical grade) (3% strength salt solution). The solution is stirred for 5 minutes at 500 rev/min and then added to 400 g of Class G cement; the mixture is stirred for 3 minutes and introduced immediately into the measuring container.

The action of the additive on the cement slurry was ascertained, using the retardation of the stiffening process, by measuring the viscosity of the cement slurry over the course of time. As the cement slurries are not sedimenting cement slurries, a Fann viscosimeter was used for this purpose (see also K. H. Grodde "Bohrspülungen and Zementschlamm in der Tiefbohrtechnik", ("Bore fluids and cement slurries in deep-well technology") 1963, page 141).

The measuring is carried out while the cement slurry is held at 60° C. in a water bath, the measured values being read off immediately after the cement slurry had been introduced into the measuring container and thereafter at five-minute intervals.

Parallel with this, the water retention of the cement slurry and the effectiveness of the additive were tested using a filter press by determining the filtrate loss at 7 bar and room temperature.

The measured results obtained according to the two methods with different additives are summarized in Table 1.

TABLE 1

Viscosity of the cement slurries at 60° C. measured with the Fann viscosimeter at 3 rev/min

| Product | without | Product of Example 1 | Product of Example 2 | Product of Example 3 | Product of Example 4 | Product of Example 5 |
|---|---|---|---|---|---|---|
| Cement slurry | water with 3% NaCl Class G cement W:C = 0.44 | 1% in water with 3% NaCl Class G cement W:C = 0.44 | 1% in water with 3% NaCl Class G cement W:C = 0.44 | 1% in water with 3% NaCl, Class G cement W:C = 0.44 | 1% in water with 3% NaCl, Class G cement W:C = 0.44 | 1% in water with 3% NaCl, Class G cement W:C = 0.44 |
| Time (min.) | | | | Viscosity (mPa . s) | | |
| 0 | 11 | 1 | 2 | 2–3 | 5 | 8 |
| 5 | 28 | 2 | 6 | 8 | 80 | 96 |
| 10 | 42 | 14 | 19 | 10 | 153 | 168 |
| 15 | 54 | 9 | 27 | 11 | (stiffening time accelerated) | |
| 20 | 71 | 9 | 31 | 20 | | |
| 25 | 88 | 9 | 33 | 24 | | |
| 30 | 95 | 10 | 35 | 31 | | |
| 35 | 102 | 10 | 37 | 33 | | |
| 40 | | 12 | 39 | 35 | | |
| 45 | | 13 | 39 | 37 | | |
| 50 | | 15 | 39 | 41 | | |
| 55 | | 16 | 39 | 43 | | |
| 60 | | 18 | 42 | 46 | | |
| Water loss (WL) (ml) at 7 bar and 20° C. after 30 minutes | >300 ml | 5 ml | 3 ml | 12 ml | >300 ml | 86 ml |

EXAMPLE 7

Using a high-temperature and high-pressure filter press (Baroid No. 387), a commercial product based on cellulose in current use and the product according to Example 2 were tested by way of comparison under a pressure of 35 bar and a thermal stress of 80° C.

For this purpose, the products were dissolved in water and the solution was added to Class G cement after 30 minutes and stirred for 20 minutes at 100 rev/min. The cement slurries were then heated for 30 minutes to initiate the filtration process thereafter.

After 5 minutes the commercial product had a water loss of 72 ml, and the cement slurry had stiffened ($N_2$ evolved).

After 5 minutes the product according to Example 2 had a water loss of 48 ml, but the cement slurry stiffened only after 16 minutes.

EXAMPLE 8

Using cements of Classes D, E and G, cement slurries were produced and the viscosity values of the starting dispersions were ascertained by way of comparison with the viscosity values after addition of 0.1% (based on the cement) of the product according to Example 1, and using the Fann viscosimeter.

| Composition of the cement slurries | Viscosity without additive (mPa . s) | Viscosity with addition of 0.1% (mPa . s) |
|---|---|---|
| 500 g of Class D cement, 190 g of water C:W = 0.38 | 78 | 61 |

-continued

| Composition of the cement slurries | Viscosity without additive (mPa . s) | Viscosity with addition of 0.1% (mPa . s) |
|---|---|---|
| 500 g of Class E cement, 275 g of water W:C = 0.55 | 18 | 15 |
| 500 g of Class G cement, 220 g of water W:C = 0.44 | 200 | 159 |

After addition of the additive to the cement slurry, a decrease in viscosity in the dispersion is noticeable.

The products obtained according to Examples 1 and 2, which are active as additives in cement slurries, inhibit the swelling of readily hydratable clays.

As proof of this, the polymerizates were tested in a photometric analysis method (see "Zeitschrift Brunnenbau, Bau for Wasserwerke, Rohrleitungsbau" (Well Sinking, Waterworks Construction, Drain Construction Journal) 12, 1977, page 453).

The value $Q_{10}$ to be given as the measure of the swelling of the clay and the dispersing of the swollen material is decreased by the polymerizates according to Examples 1 and 2.

An aqueous cement extract was prepared by stirring PZ 350 F into an amount of tap water such that, after 10 minutes' sedimentation time, a ratio of cement phase to water phase of approximately 1:1 was obtained.

In the filtered extract, the following values were measured:

| | |
|---|---|
| with 0.3% of a commercial product based on cellulose | $Q_{10} = 1.60$ |
| with 1.0% of a commercial product based on cellulose | $Q_{10} = 1.05$ |
| with 0.3% w.S. of the test product | $Q_{10} = 1.47$ |
| with 1.0% w.S. of the test product | $Q_{10} = 0.43$ |

The test product is a polymerizate according to the composition of Example 2, and the viscosity of the 25% strength aqueous solution is 4,400 mPa.s.

It will be appreciated that the instant specification and examples are set forth by way of illustration and not limitation, and that various modifications and changes may be made without departing from the spirit and scope of the present invention.

What we claim is:

1. In the cementing of a deep-well employing a deep-well cement slurry, the improvement which comprises including in such cement or cement slurry an additive comprising a water-soluble anionic copolymer having a molecular weight from 50,000 to 500,000 and comprising 1 to 60 mole% of anionic structural units and 99 to 40 mole% of non-ionic structural units, the copolymer having been obtained by radical polymerization of a substantially neutral solution of the monomers.

2. A method according to claim 1, wherein the copolymer has a molecular weight from about 60,000 to 150,000.

3. A method according to claim 1, wherein the copolymer has a molecular weight from about 70,000 to 150,000.

4. A method according to claim 1, wherein the copolymer comprises about 10 to 50 mole % of anionic structural units and about 90 to 50 mole % of non-ionic structural units.

5. A method according to claim 1, wherein the copolymer comprises about 20 to 40 mole % of anionic structural units and about 80 to 60 mole % of non-ionic structural units.

6. A method according to claim 1, wherein the anionic structural units of the copolymer comprise salts of acrylic acid and/or methacrylic acid.

7. A method according to claim 1, wherein the non-ionic structural units of the copolymer comprise acrylamide and/or methacrylamide.

8. A method according to claim 1, wherein the copolymer comprises units of acrylamide and acrylic acid salts.

9. A method according to claim 1, wherein the copolymer further comprises up to about 10 mole % based on the sum of all monomeric structural units of at least one water-soluble monomer selected from the group consisting of vinylsulphonic acid, vinylpyrrolidone, esters of amino alcohols and acrylic acid, esters of amino alcohols and methacrylic acid and acrylic acid amidosulphonic acid.

10. A method according to claim 1, wherein the copolymer further comprises up to about 10 mole % based on the sum of all monomeric structural units of at least one water-insoluble monomer selected from the group consisting of acrylic acid esters, methacrylic acid esters and acrylonitrile.

11. A method according to claim 9, comprising a terpolymer of acrylamide, sodium acrylate and sodium vinylsulphonate.

12. A method according to claim 1, dissolved in water to a concentration of about 1 to 40% by weight.

13. A method according to claim 11, wherein in making the slurry the additive is added to the cement as an aqueous solution of about 1 to 40% concentration, the additive being present in about 0.1 to 2% by weight of the cement.

* * * * *